INVENTOR.
ROBERT C. SCHELL
By Donald G. Dalton
Attorney

Nov. 19, 1968 R. C. SCHELL 3,411,614
CONVEYOR
Original Filed April 18, 1966 4 Sheets-Sheet 2
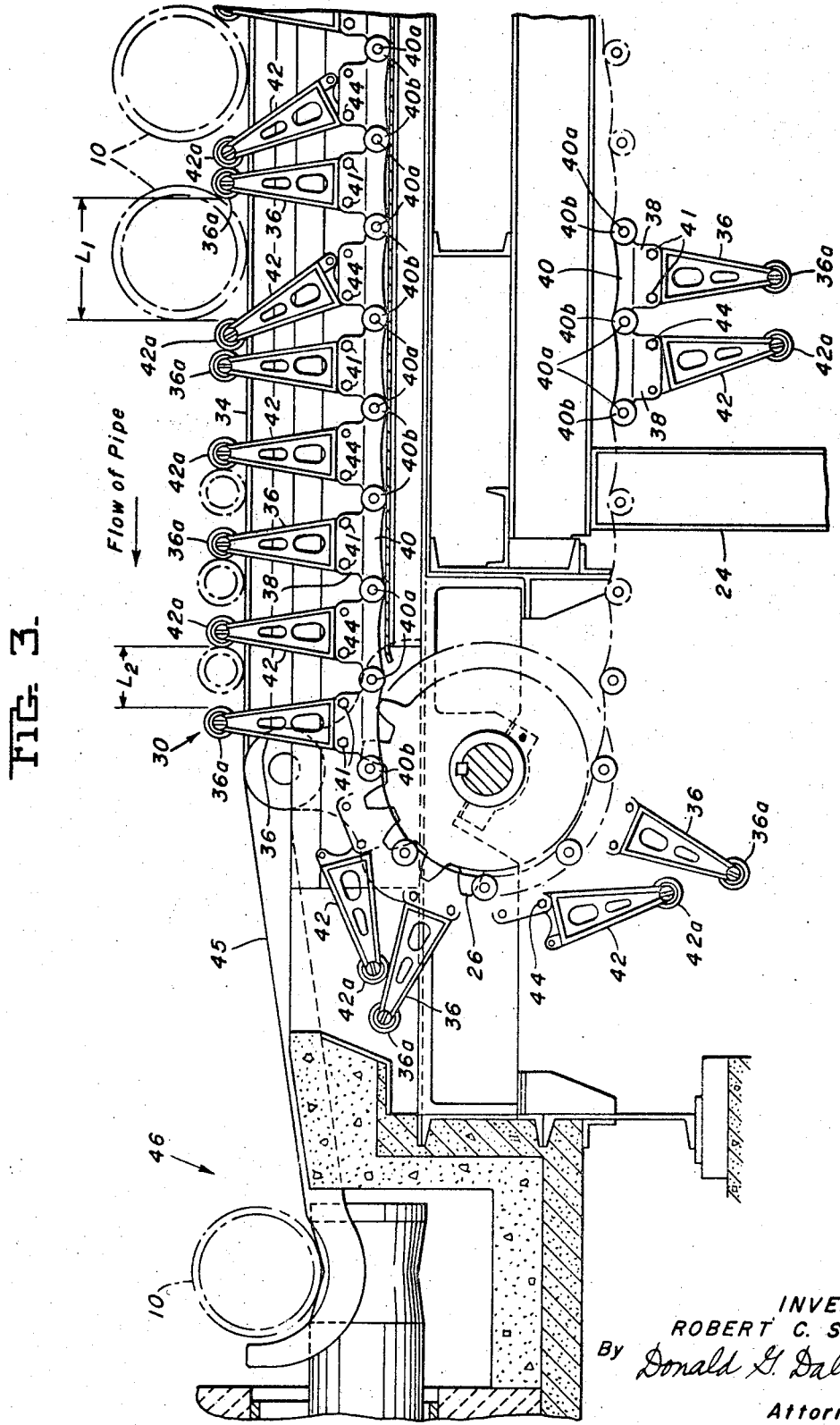
INVENTOR.
ROBERT C. SCHELL
By Donald G. Dalton
Attorney Nov. 19, 1968    R. C. SCHELL    3,411,614
CONVEYOR
Original Filed April 18, 1966    4 Sheets—Sheet 3
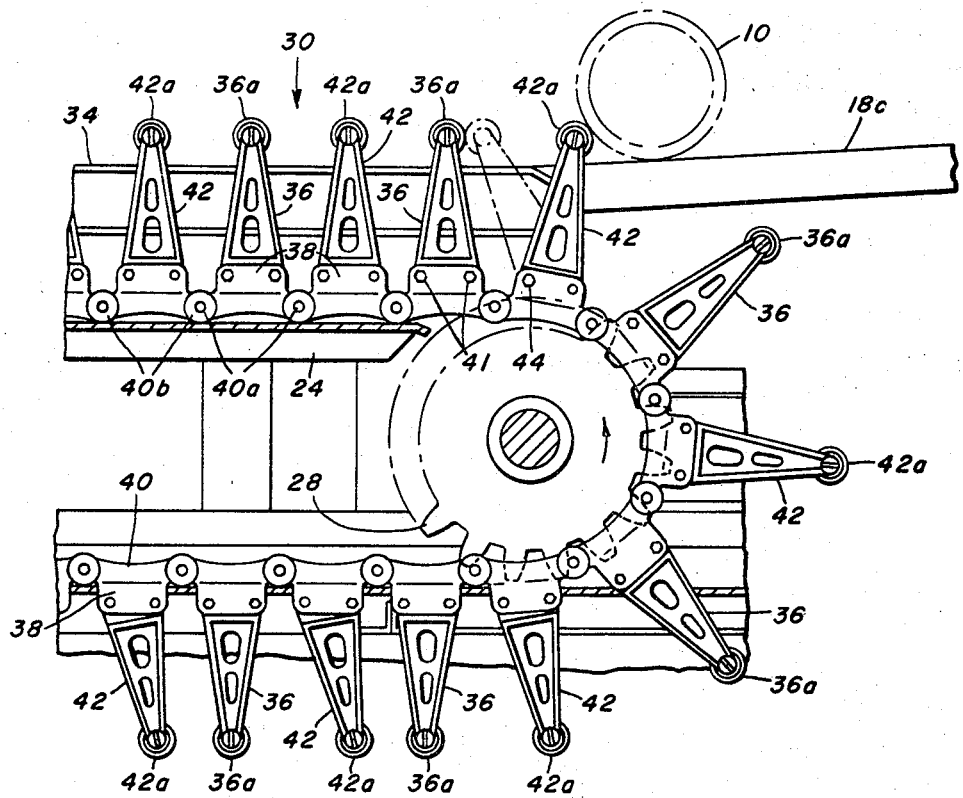
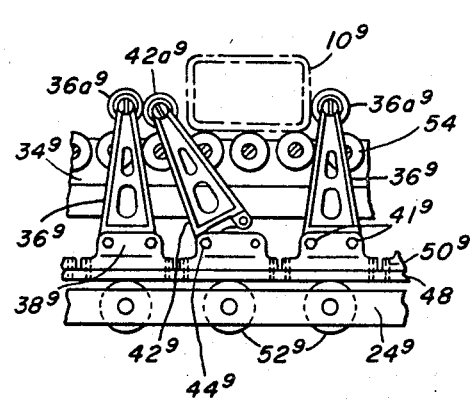
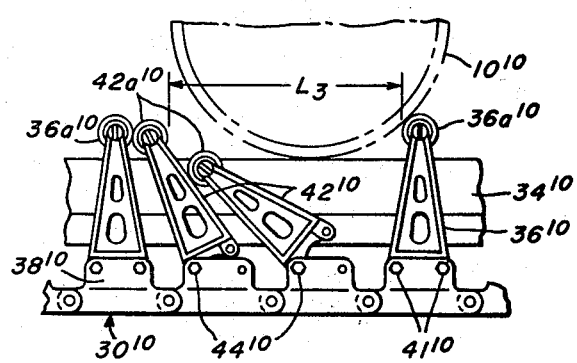
INVENTOR.
ROBERT C. SCHELL
By Donald G. Dalton
Attorney

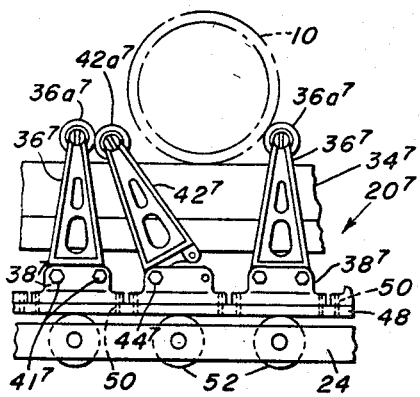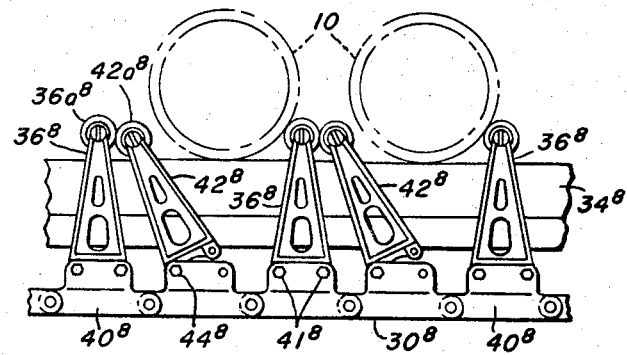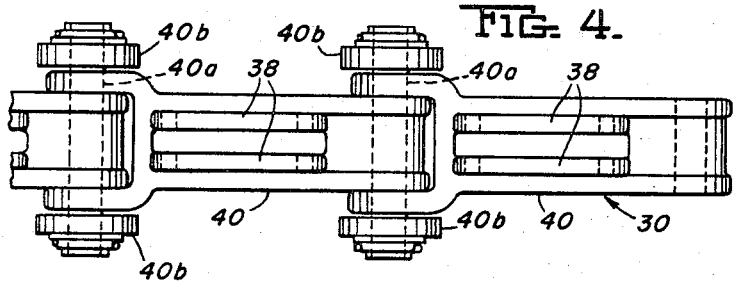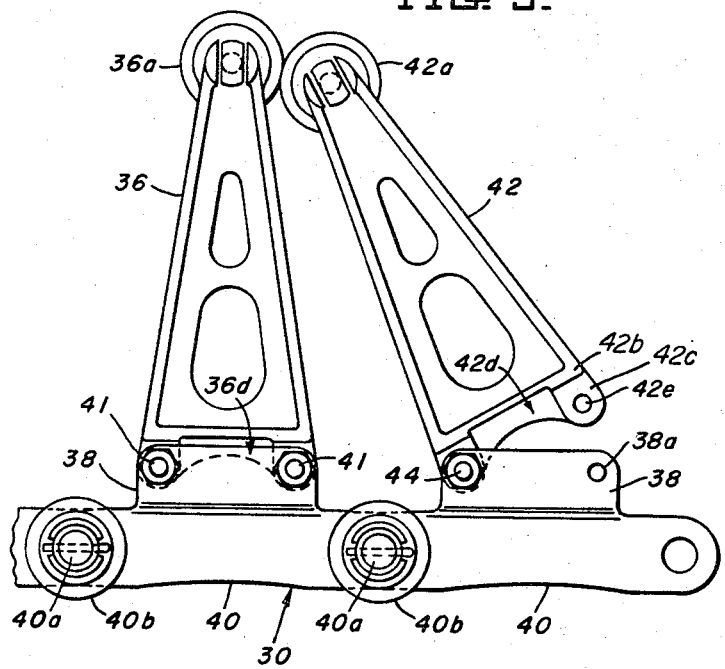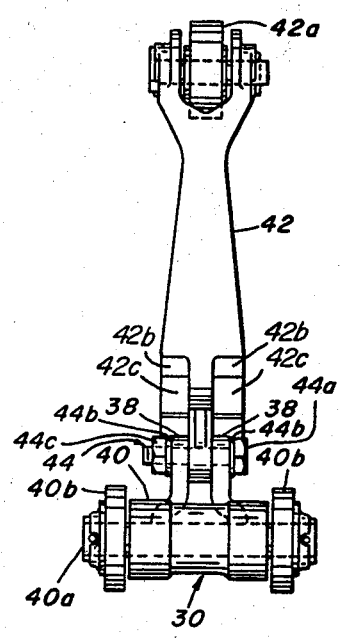
INVENTOR.
ROBERT C. SCHELL
By Donald H. Dalton
Attorney United States Patent Office 3,411,614
Patented Nov. 19, 1968

3,411,614
CONVEYOR
Robert C. Schell, Penn Hills Township, Allegheny County, Pa., assignor to United States Steel Corporation, a corporation of Delaware
Continuation of application Ser. No. 543,370, Apr. 18, 1966. This application June 6, 1967, Ser. No. 644,030
12 Claims. (Cl. 198—173)

ABSTRACT OF THE DISCLOSURE

This invention relates to conveyors and more particularly to improved work spacing means for conveyors which spacing means include a first fixed means and a second pivotable means, the pivotable means having a first portion engageable with the conveyor and a second portion engageable with a fixed means to limit pivotable movement of the pivotable means.

---

This is a continuation of Ser. No. 543,370, filed Apr. 18, 1966, now abandoned.

Heretofore, conventional conveyors of the constant speed type used, for example, fixed work spacing means, such as fixed dogs, to convey workpieces, such as pipe of varying diameter, in spaced relation through a work operation, such as a heat-treating furnace. Such fixed dogs are carried usually, for example, by alternate links of the conveyor. The pitch between the fixed dogs may be, for example, about 9 inches and the size of pipe handled by the conveyor may range from about 4½ inches O.D. to 13⅜ inches O.D. Minimum heat-treating time in seconds or conveyor speed in the furnace is estimated as about 120 times the wall thickness of a pipe with a maximum furnace rating of about 30 tons/hour. It is obvious that small sizes of pipe less than about 6 inches O.D. are spaced with an inefficiently large pitch on the conveyor and that the quantity of such small sizes of pipe is far below such maximum furnace output.

One conventional but manually operable work spacing means heretofore utilized to overcome the defects of the prior art is shown in U.S. Patent No. 1,371,968, issued Mar. 15, 1921, to F. H. Clement, It is the general object of the present invention to avoid and overcome the foregoing and other difficulties of and objections to prior art practices by the provision of an improved spacing and moving assembly for a conveyor system, which assembly:

(1) efficiently handles a wide range of sizes of workpieces;
(2) minimizes the pitch spacing of the workpieces;
(3) automatically adapts itself to the size of the workpieces being handled; and
(4) is self-righting.

The aforesaid objects of the present invention, and other objects which will become apparent as the description proceeds, are achieved by providing a spacing and moving assembly for a conveyor system for for transporting tubular objects and having a frame, a first guide means and a second guide means disposed in spaced relation on the frame, endless moving means disposed about, supported by and movable on the first guide means and the second guide means, and stationary skid means adjacent the endless conveying means for supporting the tubular objects. This spacing and moving assembly has a first spacing and driving means mounted on the endless moving means and a second spacing and driving means mounted on the endless moving means in predetermined spaced relation to and defining with the first spacing and driving means an object receiving space. The second spacing and driving means is pivotable on the endless moving means with respect to the first spacing and driving means to increase the object receiving space between the first spacing and driving means and the second spacing and driving means.

For a better understanding of the present invention reference should be had to the accompanying drawings, wherein like numerals of reference indicate similar parts throughout the several views and wherein:

FIGURE 3 is a fragmentary side elevational view, partially in section, of the conveyor system taken along the lines III—III of FIGURE 1 in the direction of the arrows and showing pipe disposed between the moving and spacing assemblies;

FIGURE 3A is a fragmentary side elevational view of the charging end of the conveyor system showing the self-righting feature of the pivotable dogs;

FIGURE 4 is a plan view of two links of conveyor chain and eliminating the dogs for clarity;

FIGURE 5 is an enlarged fragmentary side elevational view showing a fixed dog and a pivotal dog;

FIGURE 6 is an end elevational view of the pivotable dog shown in FIGURE 5;

FIGURE 7 is a fragmentary side elevational view similar to FIGURE 3 of an alternative embodiment of the conveyor system and showing a conveyor belt;

FIGURE 8 is a view similar to FIGURE 7 showing an unsupported conveyor chain;

FIGURE 9 is a view similar to FIGURE 7 showing use of the conveyor chain for non-circular workpieces; and FIGURE 10 is a view similar to FIGURES 7, 9 showing two adjacent pivotable dogs.

Although the principles of the present invention are broadly applicable to conveying systems in general, the present invention is particularly adapted for use in conjunction with a heat-treating furnace and hence it has been so illustrated and will be so described.

Figure 1:
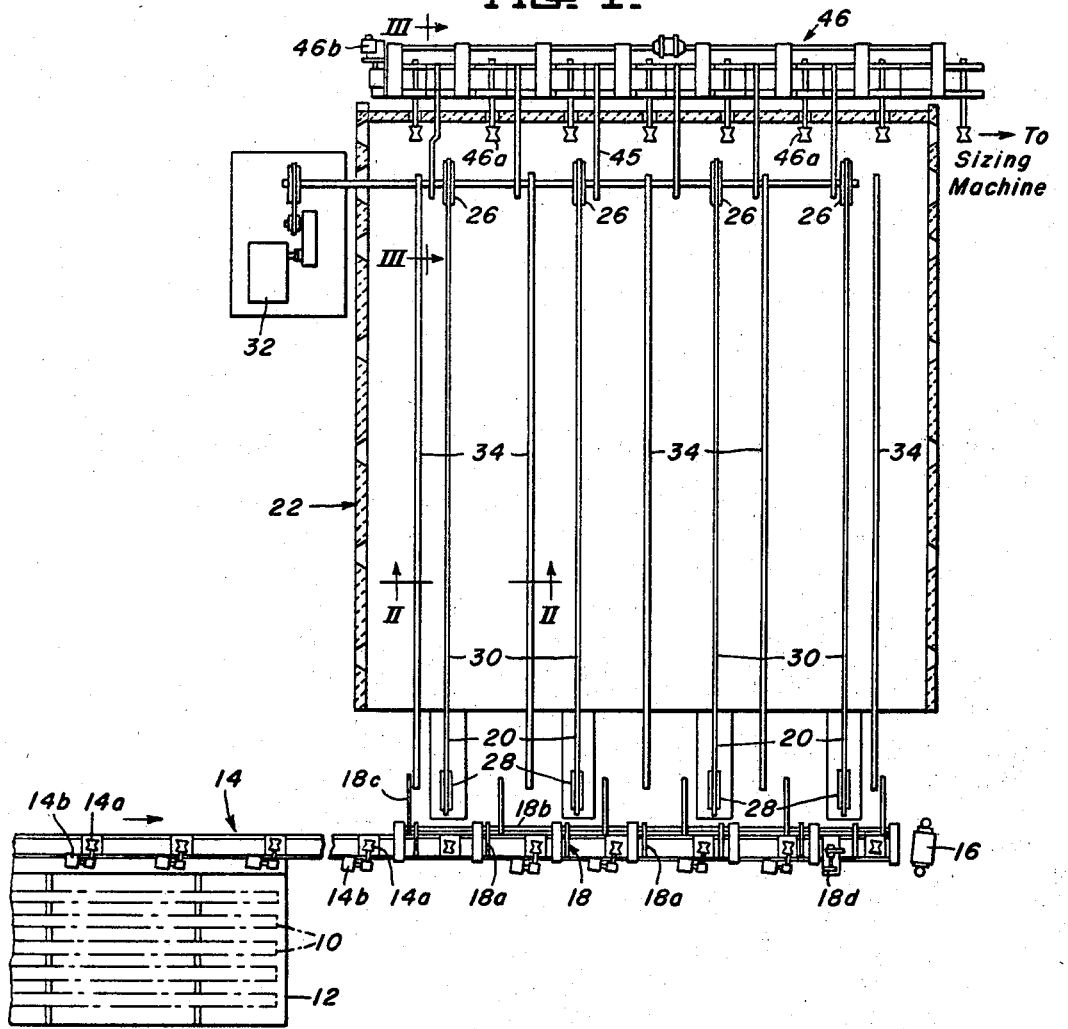
FIGURE 1 is a plan view of a heat-treating furnace and conveyor system embodying the improved moving and spacing assembly of the invention and showing a charging conveyor, transfer device and discharging conveyor.

With specific reference to the form of the present invention illustrated in the drawings, and referring particularly to FIGURE 1, elongated objects, such as a steel seamless drill pipe, are indicated generally by the reference numeral 10.

Such drill pipe 10 (FIGURES 1–3, 3A, 7, 8) is disposed on a charging table 12 (FIGURE 1) where each drill pipe 10 is inspected for heat number, wall thickness, grade and the like and is then fed onto a charging conveyor 14 utilized to deliver a drill pipe 10 against a stop 16 adjacent a transfer device 18. The charging conveyor 14 has rolls 14a (FIGURE 1) individually driven by motors 14b. Arms 18a on shaft 18b of the transfer device 18 are driven by a motor 18d. This transfer device 18 lifts the drill pipe 10 from the charging conveyor 14 and deposits the drill pipe 10 on a plurality of skids 18c and thence onto conveyor systems 20 for transporting the drill pipe 10 through a heat-treating furnace 22.

Figure 2:
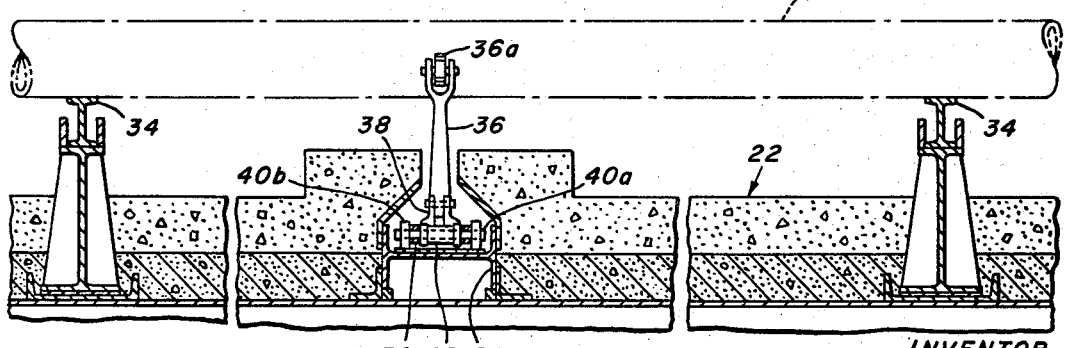
FIGURE 2 is a horizontal sectional view of a portion of the heat-treating furnace taken along the lines II—II of FIGURE 1 in the direction of the arrows.

Referring now to FIGURES 1, 2 and 3, each conveyor system 20 has a frame 24 (FIGURES 2, 3, 3A) and a first guide means and a second guide means, such as the sprockets 26, 28 (FIGURES 1, 3, 3A) disposed in spaced relation on the frame 24. Endless moving means, such as a link chain 30 (FIGURES 1–3, 3A, 4–6), are disposed about, supported by and movable on the sprockets 26, 28 by a drive means, such as a motor 32, as shown in FIG- URE 1. The link chain 30 rolls on rollers 40b along the frame 24 when such link chain 30 is in the upper position or in the work spacing and moving position (shown in FIGURE 3). Adjacent the link chain 30 are stationary skid means, such as the channels or rails 34 (FIGURES 1–3, 3A), for supporting the drill pipe 10 during its rolling path of movement through the heat-treating furnace 22.

The improved spacing and moving assembly of this invention has a first spacing and moving means, such as the fixed dogs 36 (FIGURES 2, 3, 3A, 5), mounted at 41 (FIGURES 3, 3A on side bars 38 (FIGURES 2–5, 3A) of links 40 of the link chain 30. The links 40 are connected together by pins 40a (FIGURES 2–6, 3A) carrying rollers 40b which ride on the frame 24. Each fixed dog 36 also carries a roller 36a on its free end. A second moving and spacing means, such as the pivotable dogs 42 (FIGURES 3–6, 3A), are mounted at 44 (FIGURES 3, 3A, 5, 6) on the side bars 38 and define with the fixed dogs 36 an object receiving space having a width either $L_1$ or $L_2$ (FIGURE 3). Referring to FIGURE 3A, the self-righting dog 42 assumes the desired position normal to the links 40 adjacent the sprocket 28 when such pivotable dog 42 is substantially horizontal with a first portion thereof, namely the shoulders 42b, engageable with the link chain 30 at the side bars 38 (FIGURES 5, 6) to limit the pivot of the pivotable dog 42 in one direction of pivot, namely clockwise direction (FIGURE 5). Alternatively the leg 42c is used to limit the pivot. The pivotable dogs 42 carry rollers 42a (FIGURES 3, 3A, 5, 6) on their free or upper ends. When drill pipe 10, having a diameter less than $L_2$, is positioned on the rails 34 between a fixed dog 36 and a pivotable dog 42, the pivotable dog 42 remains in the upright position shown in the left-hand portion of FIGURE 3. However, when a drill pipe 10, having a diameter greater than $L_2$ is received on the conveyor systems 20, the pivotable dog 42, pivoted at 44 on the side bars 38, is moved by the large drill pipe 10 against the adjacent fixed dog 36, as shown in the right-hand portion of FIGURE 3, with a second portion thereof, namely the roller 42a, engageable with the fixed dog 36 to limit the pivot of the pivotable dog 42 in the other direction, namely counterclockwise direction as viewed in FIGURE 5, thereby increasing the object receiving space to a distance $L_1$. The left hand leg 42c of the lower portion 42d of the pivotable dog 42 as viewed in FIGURE 5 is secured at 44 to the side links 38 by connecting means, such as a bolt 44a (FIGURE 6) extending through holes 38a (FIGURE 5) in the side links 38 and a hole 42e in the lower portion 42d, washers 44b (FIGURE 6) and a nut 44c. The fixed dog 36 has a lower portion 36d (FIGURE 5) substantially identical to the lower portion 42d of the pivotable dog 42 and such lower portion 36d is secured at points 41 by two connecting means which are substantially identical to the connecting means at 44 (FIGURE 6) for the pivotable dog 42.

After the conveyor systems 20 transports the drill pipe 10 through the heat-treating furnace 22 and onto rails 45 (FIGURES 1, 3), the drill pipe 10 rolls down the rails 45 onto a discharging conveyor 46, which discharging conveyor 46 transports the heat-treated drill pipe 10 to the next work function, such as pipe shaping in a sizing machine (not shown). This discharging conveyor 46 has rolls 46a driven by a motor 46b (FIGURE 1).

Alternative embodiments

It will be understood by those skilled in the art that alternatively, as shown in FIGURE 7, the side bars $38^7$ may be mounted on a conveyor belt 48 by means of pins or rivets 50 when the conveyor system $20^7$ is adapted for use in a cooler work zone outside the furnace 22. In this embodiment the belt 48 slides on rollers 52 on the frame 24. In FIGURE 8 the link chain $30^8$ is suspended between the sprockets 26, 28, does not have the rollers 40b of FIGURES 3, 3A and does not roll on the frame 24.

FIGURE 9 shows a conveyor system adapted for spacing and moving non-circular work pieces such as slabs, blooms, shapes $10^9$ and the like. In this embodiment the rails 34 are provided with rollers 54. In FIGURE 10 two pivotable dogs $42^{10}$ are disposed adjacent each other to provide a greater work space $L_3$.

It will be recognized by those skilled in the art that the objects of the present invention have been achieved by providing improved work spacing means for a conveyor system, which work spacing means efficiently handles a wide range of sizes of workpieces, minimizes the pitch spacing of the workpieces, automatically adapts itself to the size of the workpieces being handled and is self-righting.

While in accordance with the patent statutes preferred and alternative embodiments of the present invention have been illustrated and described in detail, it is to be particularly understood that the invention is not limited thereto or thereby.

What is claimed is:
1. In combination:
 (a) a conveyor for transporting tubular objects and having a frame, a first guide means and a second guide means disposed in spaced relation on said frame, and endless moving means disposed about, supported by a movable on said first guide means and said second guide means, and
 (b) a spacing and moving assembly having:
  (1) a first spacing and driving means having a first mounting portion,
  (2) a first connecting means for pivotably connecting said first mounting portion to said endless moving means,
  (3) a second connecting means spaced from said first connecting means for fixedly connecting said first mounting portion to said endless moving means,
  (4) a second spacing and driving means having a second mounting portion substantially identical to said first mounting portion,
  (5) a third connecting means for pivotably connecting said second mounting portion to said endless moving means in predetermined spaced relation to said first mounting portion,
   (a) said second spacing and driving means defining with said first spacing and driving means an object receiving space, and being pivotable with respect to said endless moving means to vary the object receiving space between said first spacing and driving means and said second spacing and driving means,
   (b) said second connecting means being removable from said first mounting means and said endless moving means to permit pivotable movement of said first spacing and driving means with respect to said endless moving means, and
   (c) said second connecting means being connectable to said second mounting means and said endless moving means in predetermined spaced relation to said third securing means to fixedly connect said second spacing and driving means to said endless moving means.
2. The combination recited in claim 1 wherein said second mounting portion has a first free end portion adjacent said pivot engageable with said endless moving means to limit the pivotable movement of said second spacing and driving means in one direction of pivotable movement and said second spacing and driving means has a second free end portion engageable with said first spacing and moving means to limit the pivotable movement of said second spacing and driving means in the other direction of pivotable movement.

3. The combination recited in claim 1 and having stationary skit means adjacent said endless moving means for supporting said tubular objects.

4. The combination recited in claim 3 wherein said stationary skid means has rolling means for supporting said tubular objects.

5. The combination recited in claim 1 wherein said endless moving means is a link chain.

6. The combination recited in claim 1 wherein said endless moving means is a conveyor belt.

7. The combination recited in claim 1 wherein another second spacing and driving means is similarly mounted on said endless moving means in predetermined spaced relation to said second spacing and driving means to further vary said object receiving space.

8. In combination:
  (a) a conveyor for transporting tubular objects and having a frame, a first guide means and a second guide means disposed in spaced relation on said frame, and endless moving means disposed about, supported by and movable on said first guide means and said second guide means,
    (1) said endless moving means having a plurality of links provided with side bars,
  (b) a spacing and moving assembly having:
    (1) a first spacing and driving means having a first mounting portion,
    (2) a first connecting means for pivotably connecting said first mounting portion to the side bars of one link of said endless moving means,
    (3) a second connecting means spaced from said first connecting means for fixedly connecting said first mounting portion to said side bars of said one link,
    (4) a second spacing and driving means having a second mounting portion substantially identical to said first mounting portion,
    (5) a third connecting means for pivotably connecting said second mounting portion to the side bars of a second link of said endless moving means in predetermined spaced relation to said first mounting portion,
      (a) said second spacing and driving means defining with said first spacing and driving means an object receiving space, and being pivotable with respect to said endless moving means to vary the object receiving space between said first spacing and driving means and said second spacing and driving means,
      (b) said second connecting means being removable from said first mounting means and said side bars of said one link to permit pivotable movement of said first spacing and driving means with respect to said endless moving means, and
      (c) said second connecting means being connectable to said second mounting means and said side bars of said second link in predetermined spaced relation to said third connecting means to fixedly connect said second spacing and driving means to said endless moving means.

9. The combination recited in claim 8 wherein said second mounting portion has a shoulder portion adjacent said pivot engageable with said side bars of said second link of said endless moving means to limit the pivotable movement of said second spacing and driving means in one direction of pivotable movement and said second spacing and driving means has a second free end portion engageable with said first spacing and moving means to limit the pivotable movement of said second spacing and driving means in the other direction of pivotable movement.

10. The combination recited in claim 8 and having stationary skid means adjacent said endless moving means for supporting said tubular objects.

11. The combination recited in claim 10 wherein said stationary skid means has rolling means for supporting said tubular objects.

12. The combination recited in claim 8 wherein another second spacing and driving means is similarly mounted on said endless moving means a predetermined spaced relation to said second spacing and driving means to further vary said object receiving space.

References Cited

UNITED STATES PATENTS 2,554,935   5/1951   Boucher.

FOREIGN PATENTS 528,161   10/1940   Great Britain.
1,017,068   12/1952   France.

EDWARD A. SROKA, *Primary Examiner.*